Figure 1:
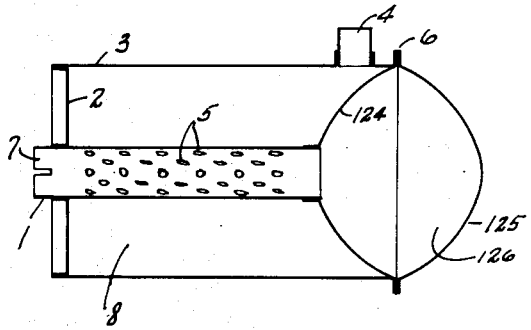
Figure 3:
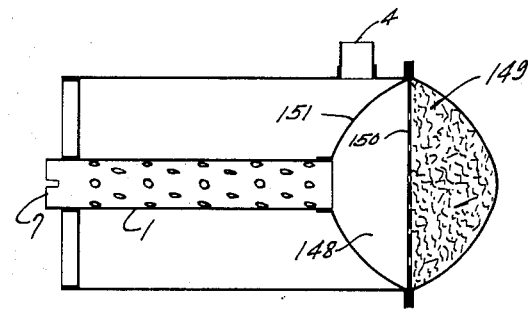
Figure 2:
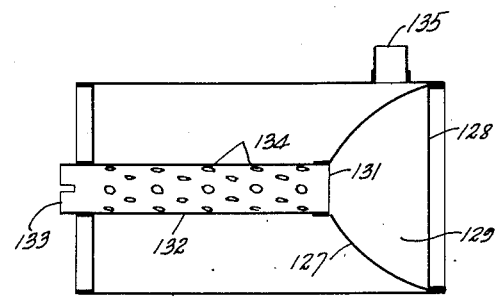

Jan. 21, 1941.   F. H. GULLIKSEN   2,229,451
PHOTOSENSITIVE APPARATUS FOR INSPECTING MATERIALS
Filed April 18, 1939
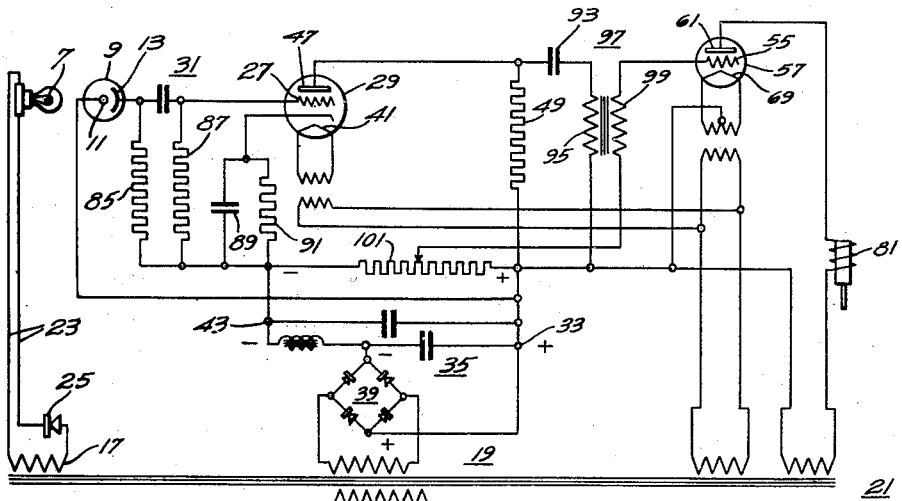
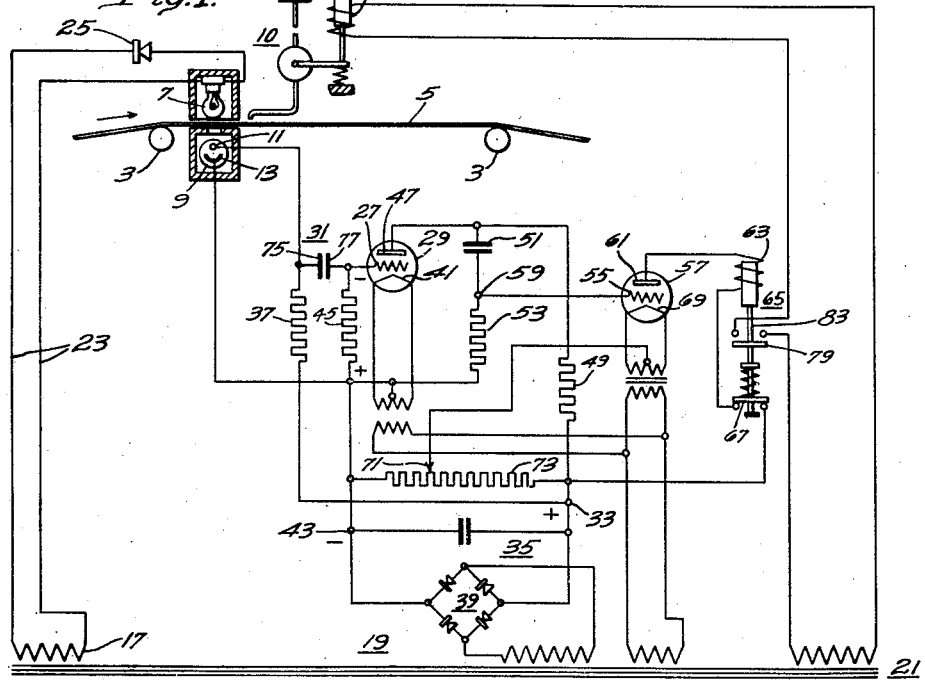
WITNESSES:
INVENTOR
Finn H. Gulliksen.
BY
ATTORNEY Patented Jan. 21, 1941

2,229,451

UNITED STATES PATENT OFFICE 2,229,451

PHOTOSENSITIVE APPARATUS FOR INSPECTING MATERIALS

Finn H. Gulliksen, Pittsburgh, Pa., assignor to Westinghouse Electric & Manufacturing Company, East Pittsburgh, Pa., a corporation of Pennsylvania (Cl. 250—41.5)

materially, it is not satisfactory when the speed varies over a wide range, as is the case during starting and stopping operations. In such a case, the rate of change in the light impinging on the material produced by a small hole is too small to operate the classifying mechanism and the apparatus is unreliable.

It is accordingly an object of my invention to provide a reliable classifying system for detecting holes in sheet metal while it is moving at a speed that may vary over a wide range.

Another object of my invention is to provide a reliable photosensitive classifying arrangement having high sensitivity that shall not respond to stray radiation.

A more general object of my invention is to provide a reliable radiation responsive arrangement of simple structure that is operable only when energized by radiant energy, the intensity of which is changing.

An ancillary object of my invention is to provide a radiant energy emitter particularly adapted for use with a photoresponsive device actuable only by radiant energy which is varying in intensity.

A further ancillary object of my invention is to provide a radiant energy emitter devoid of any moving parts for use with a photoresponsive device actuable only by radiant energy which is varying in intensity.

More concisely stated, it is an object of my invention to provide a photosensitive classifying system which combines simplicity in structure with sensitivity and reliability in operation, for detecting holes in sheet metal that may move at different speeds.

According to my invention, I provide a classifying arrangement in which the intensity of the radiant energy projected on the surface of the sheet metal to be classified has a constant component on which a variable, preferably periodic, component is superimposed. In cooperation with the radiant energy source, a dynamic photoelectric amplifier is used. The latter responds only to varying radiant energy, the time rate of change of which is substantially smaller than the rate corresponding to the varying component of the radiant energy. When the sheet metal is moving at a high speed an instantaneous, abrupt increase in the excitation of the photoelectric cell is produced by a small hole My invention has been described herein as specifically applied to the detection of holes in sheet metal merely for the purpose of illustrating its utility and not with any intention of limiting its scope. Where my invention is used in connection with non-metals or to detect other inhomogeneities than holes, such use is regarded as within the scope thereof. The same is, of course, true for the situation where my invention is used in a system in which the photoelectric tube 9 responds to reflected radiations in lieu of transmitted radiations.

Although I have shown and described certain specific embodiments of my invention, I am fully aware that any modifications thereof are possible. My invention, therefore, is not to be restricted except in so far as it is necessitated by the prior art and by the spirit of the appended claims.

I claim as my invention:

1. In combination, photosensitive means responsive to a change in radiant energy impinging thereon, which has a time rate greater than a predetermined rate, a source of radiant energy, of the type for which the intensity of radiant energy emitted varies with the potential impressed, disposed to energize said photosensitive means and means for impressing alternate half-cycles of potential on said source.

2. For use with an alternating current supply, the combination comprising photosensitive means responsive to a change in radiant energy impinging thereon, having a time rate greater than a predetermined rate, a source of radiant energy, of the type for which the intensity of radiant energy emitted varies with the potential impressed, disposed to energize said photosensitive means and means for impressing alternate half-cycles of potential from said supply on said source.

3. For use with an alternating current supply, the combination comprising photosensitive means responsive to a change in radiant energy impinging thereon, having a time rate greater than a predetermined rate, a source of radiant energy, of the type for which the intensity of radiant energy emitted varies with the potential impressed, disposed to energize said photosensitive means and circuit means having current rectifying means interposed therein for energizing said source from said supply.

4. For use with an alternating current supply, the combination comprising photosensitive means responsive to a change in radiant energy impinging thereon, having a time rate greater than a predetermined rate, a source of radiant energy, of the type for which the intensity of radiant energy emitted varies with the potential impressed, disposed to energize said photosensitive means and circuit means having current rectifying means interposed therein for energizing said source from said supply, said predetermined rate being substantially less than the rate of change in the radiant energy produced by the normal cyclic potential variations of said source.

5. For use with a 60 cycle alternating current supply, the combination comprising photosensitive means responsive to a change in radiant energy impinging thereon, having a time rate greater than a predetermined rate, a source of radiant energy having an incandescent filament, and means for impressing alternate half-cycles of potential from said supply on said source.

6. For use with an alternating current supply, the combination comprising photosensitive means responsive to a change in radiant energy impinging thereon, having a time rate greater than that corresponding to a frequency substantially smaller than the frequency of said supply, a source of radiant energy, of the type for which the intensity of radiant energy emitted varies with the potential impressed, disposed to energize said photosensitive means and circuit means having rectifying means interposed therein for energizing said source from said supply.

7. For use with a 60 cycle alternating current supply, the combination comprising photosensitive means responsive to a change in radiant energy impinging thereon, having a time rate greater than that corresponding to a frequency of the order of one cycle per second, a source of radiant energy having an incandescent filament disposed to energize said photosensitive means and circuit means capable of conducting current of only one polarity for energizing said source from said supply.

8. For use with an alternating current supply, the combination comprising photosensitive means responsive to a change in radiant energy impinging thereon, having a time rate greater than that corresponding to a frequency substantially smaller than the frequency of said supply, and comprising a photoelectric cell, a high vacuum electric discharge valve having input and output electrodes, a capacitor for coupling said cell to said valve, an arc-like electric discharge valve having input and output circuit and another capacitor for coupling the output circuit of said first-mentioned valve to the input circuit of said last-mentioned valve, a source of radiant energy, of the type for which the intensity of radiant energy emitted varies with the potential impressed, disposed to energize said photosensitive means and vary the conductivity of said last-mentioned valve and circuit means having half-wave rectifying means interposed therein for energizing said source from said supply.

9. For use with an alternating current supply, the combination comprising photosensitive means responsive to a change in radiant energy impinging thereon, having a time rate greater than that corresponding to a frequency substantially smaller than the frequency of said supply, and comprising a photoelectric cell, a high vacuum electric discharge valve having input and output electrodes, a capacitor for coupling said cell to said valve, an arc-like electric discharge valve having input and output circuits, another capacitor for coupling the output circuit of said first-mentioned valve to the input circuit of said last-mentioned valve and means for impressing a direct potential derived from said source in the output circuit of said last-mentioned valve, a source of radiant energy, of the type for which the intensity of radiant energy emitted varies with the potential impressed, disposed to energize said photosensitive means and render said last-mentioned valve conductive and means responsive to the current conducted by said last-mentioned valve for rendering said last-mentioned valve non-conductive and circuit means having half-wave rectifying means interposed therein for energizing said source from said supply.

10. For use in classifying material that may move at different speeds, the combination comprising a source of radiant energy, the intensity of which has an appreciably constant component on which is superimposed an appreciable periodic component, means for subjecting said material in motion to said source, and photosensitive means responsive to the resultant radiant energy emitted by said material and actuable by a change in radiant energy impinging thereon, said change in radiant energy having a time rate substantially greater than the frequency of said periodic component.

11. For use with an alternating current supply, the combination comprising a photoelectric cell, a high vacuum electric discharge valve having input and output electrodes, a capacitor for coupling said cell to said valve, an arc-like electric discharge valve having input and output circuit and another capacitor for coupling the output circuit of said first-mentioned valve to the input circuit of said last-mentioned valve, a source of radiant energy, of the type for which the intensity of radiant energy emitted varies with the potential impressed, disposed to energize said photoelectric cell and vary the conductivity of said last-mentioned valve and circuit means having half-wave rectifying means interposed therein for energizing said source from said supply.

12. In combination photosensitive means responsive only to a change in the radiant energy impinging thereon, a source of radiant energy of the type for which the intensity of the radiant energy emitted varies with the potential impressed and circuit means adapted to pass alternate half-cycles of an alternating potential for supplying potential to said source.

13. For use in classifying material that may move at different speeds, the combination comprising a source of radiant energy, the intensity of which changes continually, said source of radiant energy including an emitter having an incandescent filament and a circuit for supplying current to said emitter adapted to pass alternate half-cycles from an alternating current source, means for subjecting said material in motion to said source, and photosensitive means actuable only by a change in radiant energy impinging thereon responsive to the resultant radiant energy emitted by said material.

14. For use in detecting perforations in moving sheet material, the speed of which may vary over a wide range, the combination comprising means for projecting on one surface of said sheet radiant energy, the intensity of which has an appreciable constant component on which a variable component is superimposed, and photosensitive means disposed to receive the resultant radiant energy which penetrates perforations in said sheet, said photosensitive means being actuable by a change in radiant energy impinging thereon having a time rate such that for a perforation in sheet moving at a speed smaller than a predetermined speed it is actuated by reason of said variable component in said radiant energy and for a perforation in a sheet moving at a speed greater than said predetermined speed it is actuated by reason of the change in said radiant energy produced by the movement of said sheet.

15. For use in classifying material that may move at different speeds, the combination comprising a source of radiant energy, the intensity of which has an appreciable constant component on which is superimposed an appreciable variable component, means for subjecting said material in motion to said source, and photosensitive means responsive to the resultant radiant energy emitted by said material and actuable by a change in radiant energy impinging thereon, said change in radiant energy having a time rate substantially greater than the time rate of change of said variable component.

FINN H. GULLIKSEN.

Jan. 28, 1941.   C. F. RAUEN   2,229,672
MUFFLER
Original Filed Feb. 10, 1930

INVENTOR.
CARL F. RAUEN
BY
ATTORNEYS